United States Patent
Schroder et al.

(10) Patent No.: US 12,287,881 B2
(45) Date of Patent: Apr. 29, 2025

(54) TRUST CHAIN PRESERVATION FOR REMOTE ATTESTATION

(71) Applicant: Extreme Networks, Inc., San Jose, CA (US)

(72) Inventors: Steve W. Schroder, Lake Oswego, OR (US); Ramanuja Chaitanya Chakravarthula, Chennai (IN); Kristopher F. Orjada, Ashburn, VA (US); Bagavath Singh Swamynatha Pillai, Bangalore (IN); Michael B. Rash, Mt. Airy, MD (US); Albert Tao, Carmel, CA (US)

(73) Assignee: Extreme Networks, Inc., San Jose, CA (US)

( * ) Notice: Subject to any disclaimer, the term of this patent is extended or adjusted under 35 U.S.C. 154(b) by 302 days.

(21) Appl. No.: 17/717,581

(22) Filed: Apr. 11, 2022

(65) Prior Publication Data

US 2023/0325509 A1    Oct. 12, 2023

(51) Int. Cl.
    *G06F 21/57*    (2013.01)
    *G06F 21/60*    (2013.01)
    *G06F 21/64*    (2013.01)

(52) U.S. Cl.
    CPC .......... *G06F 21/575* (2013.01); *G06F 21/577* (2013.01); *G06F 21/602* (2013.01); *G06F 21/64* (2013.01)

(58) Field of Classification Search
    None
    See application file for complete search history.

(56) References Cited

U.S. PATENT DOCUMENTS 8,843,650 B2 *   9/2014  Song ....................... H04L 63/10
                                                   717/172
2006/0015717 A1  1/2006  Liu et al.
(Continued)

FOREIGN PATENT DOCUMENTS

CN          113986470 A  *  1/2022

OTHER PUBLICATIONS

Integrity Measurement Architecture, Gentoo wiki, 2021 [retrieved Feb. 28, 2022]; Retrieved from the Internet: <URL: https://wiki.gentoo.org/wiki/Integrity_Measurement_Architecture>; 9 pages.
(Continued)

*Primary Examiner* — Philip J Chea
*Assistant Examiner* — James Ross Hollister
(74) *Attorney, Agent, or Firm* — Sterne, Kessler, Goldstein & Fox P.L.L.C.

(57) ABSTRACT

Disclosed herein are system, method, and computer program product embodiments for verifying the integrity of a boot process without relying on a boot aggregate value. An embodiment operates by cryptographically validating, by a hardware root of trust, a first code module associated with a digital signature. The embodiment determines that the first code module was cryptographically validated and cryptographically measures the first code module thereby generating a first measurement. The embodiment stores a representation of the first measurement in a first platform configuration register (PCR) of a trusted platform module. The embodiment configures a remote attestation agent to instruct a remote attestation server to attest the value stored in the first PCR. The embodiment transmits a TPM attestation quote to the remote attestation server. The embodiment receives an acknowledgment from the remote attestation server indicating a match between the value stored in the first PCR and an allowed cryptographic measurement.

20 Claims, 3 Drawing Sheets

(56) References Cited

U.S. PATENT DOCUMENTS

| | | | |
|---|---|---|---|
| 2006/0161784 A1* | 7/2006 | Hunter | G06F 21/575 |
| | | | 713/182 |
| 2008/0059799 A1 | 3/2008 | Scarlata | |
| 2017/0170966 A1* | 6/2017 | Sarangdhar | G06F 21/64 |
| 2018/0004953 A1* | 1/2018 | Smith, II | H04L 9/3268 |
| 2018/0330093 A1 | 11/2018 | Shivanna et al. | |
| 2019/0347164 A1* | 11/2019 | Nightingale | G06F 11/1076 |
| 2020/0099536 A1* | 3/2020 | Block | H04L 9/3236 |
| 2020/0167474 A1* | 5/2020 | Goldman | H04L 9/3247 |
| 2024/0134966 A1* | 4/2024 | Gurel | G06F 21/53 |

OTHER PUBLICATIONS

Kasatkin et al., Integrity Measurement Architecture (IMA), SourceForge, 2018 [retrieved Feb. 28, 2022]; Retrieved from the Internet: <URL: https://sourceforge.net/p/linux-ima/wiki/Home/>; 18 pages.

Keylime: Bootstrap & Maintain Trust on the Edge/Cloud an IoT, Keylime [retrieved Feb. 28, 2022]; Retrieved from the Internet: <URL: https://keylime.dev/>; 4 pages.

Keylime: A CNCF Project to Bootstrap & Maintain Trust on the Edge/Cloud and IoT, GitHub, 2022 [retrieved Feb. 28, 2022]; Retrived from the Internet: <URL: https://github.com/keylime/keylime>; 14 pages.

Keylime, Read the Docs, 2022 [retrieved Feb. 28, 2022]; Retrieved from the Internet: <URL: https://readthedocs.org/projects/keylime-docs/>; 2 pages.

International Search Report and Written Opinion of the International Searching Authority directed to International Patent Application No. PCT/US2023/018045, mailed Jul. 31, 2023; 9 pages.

* cited by examiner

TRUST CHAIN PRESERVATION FOR REMOTE ATTESTATION

BACKGROUND

Exploiting computing devices (e.g., embedded networking devices) by planting malware in one or more components of the boot process or filesystem is a security attack that leads the computing devices to boot or execute in a compromised state. Measured boot and remote attestation are technologies that can be used to detect malware in boot components and filesystem binaries at runtime with the help of a trusted platform module (TPM) chip installed in the computing devices. As part of the measured boot process, a boot aggregate value can be calculated over the contents of the TPM chip to verify the integrity of the boot process. However, the boot aggregate value often cannot be implicitly trusted because the code that computes the boot aggregate value may itself implemented within an operating system (OS) kernel whose integrity is not guaranteed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
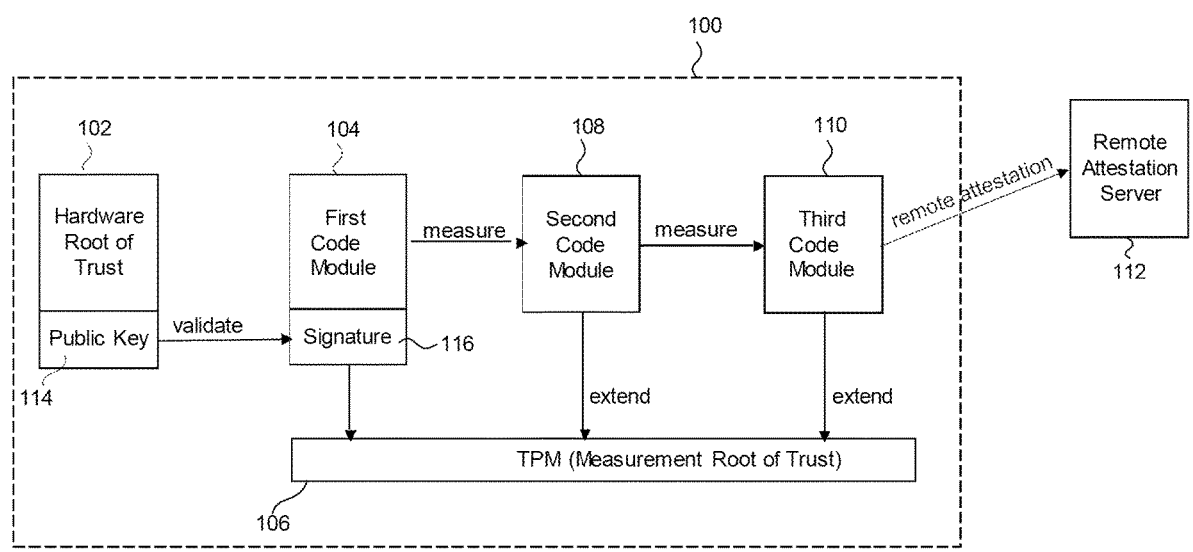
FIG. 1 is a block diagram of a system that implements trust chain preservation for remote attestation using a hardware root of trust (HWRoT), according to some embodiments.

Provided herein are system, apparatus, device, method and/or computer program product embodiments, and/or combinations and sub-combinations thereof, for verifying the integrity of a boot process for a computing device without relying on a boot aggregate value when a hardware root of trust (HWRoT) is available to build a trust chain. For example, embodiments herein validate an operating system (OS) kernel via the trust chain independently of a boot aggregate value when a HWRoT is available to build such a chain.

The integrity of the boot process for a computing device (e.g., an embedded network device) can be verified using measured boot. Measured boot is a procedure in which, prior to launching each component of the boot sequence, a cryptographic hash of the component is measured and extended to a platform configuration register (PCR) of a trusted platform module (TPM). While measuring an invalid software component in the measured boot chain or runtime filesystem binaries does not stop the boot process (in contrast to a technology such as "Secure Boot"), a digitally signed quote of extended measurements from the PCR registers can be used to detect a potentially compromised device. For example, the digitally signed quote of extended measurements can be sent to a remote attestation server to perform remote attestation.

Remote attestation is a method by which a computing device, via a remote attestation agent, authenticates its hardware and software components to a remote attestation server (e.g., a Keylime verifier). For example, the hardware components can be represented as a boot aggregate value of the PCR registers of the TPM. The software components can be represented as hashes of files, binaries, and libraries from the computing device. The remote attestation server can confirm that no tampering was done to the hardware and software components. For example, remote attestation server (e.g., a Keylime verifier) can verify that the hardware and software components have not been tampered with by comparing the boot aggregate value and hashes of filesystem binaries to an allowed list that is instantiated in the remote attestation server via an out-of-band mechanism.

An integrity measurement subsystem of an OS kernel can perform measurements of the software components (e.g., files, binaries, and libraries). For example, the integrity measurement architecture (IMA) subsystem of the Linux OS can perform measurements of the software components (e.g., files, binaries, and libraries). The integrity measurement subsystem can also compute a boot aggregate value representing the hardware components.

However, verifying the integrity of a boot process using the boot aggregate value suffers from a serious technical problem: the boot aggregate value does not take into account the existence of a HWRoT that is independent and in addition to the TPM. Because the boot aggregate value is calculated by the OS kernel, and the kernel itself should not be considered to be trusted code without external validation, the boot aggregate value itself generally cannot be trusted. In other words, the OS kernel needs to be validated via the trust chain independently of the boot aggregate value when a HWRoT is available to build such a chain.

To solve the above technological problem, embodiments herein modify the remote attestation agent running on the computing device to not rely on the boot aggregate value but rather to rely on the individual PCRs that are used as input to the boot aggregate value. The modified remote attestation agent is configured to instruct a remote attestation server to attest the integrity of the bootstrapping sequence. To attest to the integrity of the bootstrapping sequence, the remote attestation server can match an allowed list of cryptographic measurements with the individual PCR values. This approach bypasses reliance on the boot aggregate value when attesting to the integrity of the bootstrapping sequence. Embodiments herein further solve the above technological problem through inclusion of a HWRoT that is independent and in addition to the TPM, and creating a trust chain that is anchored to the HWRoT that extends all the way into user space operations via an integrity measurement subsystem (e.g., IMA).

FIG. 1 is a block diagram of a system 100 that implements trust chain preservation for remote attestation using a HWRoT, according to some embodiments. System 100 may be an embedded network device. For example, system 100 may be a network switch or a network router. System 100 may also be a general-purpose computer system, such as a desktop computer, laptop, tablet, or smartphone. System 100 may be various other types of systems or platforms as would be appreciated by a person of ordinary skill in the art.

System 100 may include HWRoT 102, first code module 104, TPM 106, second code module 108, and third code module 110. System 100 may communicate with remote attestation server 112 over a communications path, which may be wired and/or wireless (or a combination thereof), and which may include any combination of Local Area Networks (LANs), Wide Area Networks (WANs), the Internet, etc. Control logic and/or data may be transmitted to and from system 100 via the communication path.

HWRoT 102 may be implemented on a dedicated microcontroller, system on a chip (SoC), field programmable gate array (FPGA), or other devices as would be appreciated by a person of ordinary skill in the art. HWRoT 102 may consist of cryptographic keys rooted in the hardware of a microcontroller, SoC, or FPGA. The firmware and/or logic that implements HWRoT 102 may not be cryptographically validated before it is executed. The firmware and/or logic that implements HWRoT 102 may be immutable and may be implicitly trusted to be correct.

First code module 104 may be a firmware used to perform hardware initialization during the boot process. For example, first code module 104 may be a basic input-output system (BIOS) image or a unified extensible firmware interface (UEFI) image. First code module 104 may also be an open network installation environment (ONIE) module.

HWRoT 102 may cryptographically validate first code module 104 before it is executed by a central processing unit (CPU) of system 100. To cryptographically validate first code module 104, HWRoT 102 may validate a cryptographic signature 116 associated with first code module 104. Cryptographic signature 116 may represent a known state of first code module 104. To generate cryptographic signature 116, software running on a CPU of system 100 may generate a cryptographic hash of code module 104 using a hash algorithm. Software running on a CPU of system 100 may then encrypt the generated hash using a private key corresponding to first code module 104 to generate cryptographic signature 116 associated with first code module 104.

HWRoT 102 may validate cryptographic signature 116 to verify the identity and integrity of first code module 104. HWRoT 102 may validate cryptographic signature 116 by decrypting the cryptographic hash of cryptographic signature 116 using public key 114 associated with first code module 104 thereby obtaining a first hash value corresponding to first code module 104. HWRoT 102 may then execute the hash algorithm over first code module 104 thereby generating a second hash value. A match between the first hash value and the second hash value successfully validates cryptographic signature 116, and thereby verifies that the integrity and identity of first code module 104 have not been compromised.

First code module 104 may be firmware used to perform hardware initialization during the boot process. HWRoT 102 may check a cryptographic signature 116 associated with first code module 104. First code module 104 may be a UEFI image, and HWRoT 102 may check a cryptographic signature 116 of firmware instructions corresponding to the UEFI image using public key 114. First code module 104 may also be a BIOS image, and HWRoT 102 may check a cryptographic signature 116 of firmware instructions corresponding to the BIOS image using public key 114.

In some aspects, when HWRoT 102 successfully validates cryptographic signature 116, software running on a CPU of system 100 may allow first code module 104 to execute. However, when HWRoT 102 fails to successfully validate cryptographic signature 116, first code module 104 may be replaced by an immutable golden image of first code module 104. Further, the new copy of first code module 104 may be validated by HWRoT 102 before being allowed to execute by software running on a CPU. Swapping out code module 104 with the immutable golden image may ensure preservation of the trust chain.

In some aspects, once first code module 104 is cryptographically validated by HWRoT 102, software running on a CPU of system 100 may start a measured boot chain with HWRoT 102 as the starting point of a chain of trust. In a measured boot chain, each code module may cryptographically measure the next code module in the boot chain before executing it. For example, each code module may calculate a cryptographic hash value of the next code module in the boot chain. As a non-limiting example, the cryptographic hash value may be calculated using secure hash algorithm 256 (SHA-256, SHA3-256, or other cryptographic hash algorithms as would be appreciated by a person of ordinary skill in the art.

HWRoT 102 may cryptographically measure first code module 104 and send the measurement to TPM 106. For example, HWRoT 102 may calculate a hash value corresponding to first code module 104 and send it to TPM 106. HWRoT 102 may store a representation of the cryptographic measurement in a PCR of the TPM 106. For example, HWRoT 102 may use a PCR extend function to store a representation of the cryptographic measurement in a PCR of the TPM 106. Performing a PCR extend function may involve adding a cryptographic measurement (e.g., a hash value) to an existing cryptographic measurement in a PCR of TPM 106, and the resultant hash value is stored back in the same PCR of TPM 106. According to some aspects, first code module 104 may cryptographically measure itself. Since HWRoT 102 validates first code module 104, the first code module 104's measurement of itself may be considered trusted. According to some aspects, software running on a CPU of system 100 may cryptographically measure first code module 104 and extend the measurement to a PCR of TPM 106. For example, software running on a CPU of system 100 may calculate a hash value corresponding to first code module 104 and extend the hash value to a PCR of TPM 106.

TPM 106 may be a tamper-resistant crypto-processor for performing cryptographic operations in a trusted and secure manner. TPM 106 may include a set of PCRs that are accessible to a CPU of system 100 and provide storage slots into which cryptographic measurements can be stored. There may be two approaches to changing the values of the PCRs in TPM 106. A first approach may be to reboot system 100, which clears all PCRs of TPM 106 and sets their value to 0. A second approach may be to use TPM 106's extend function. For example, executing TPM 106's extend function "extend(i, X)" for the value X can instruct TPM 106 to set the ith PCR (e.g., PCR[i]), to SHA256(PCR[i]||X), where SHA256(PCR[i]||X) represents a SHA-256 hash of the current value of the register "PCR[i]" and the extended value "X."

Second code module 108 may be a bootloader program. Second code module 108 may be a single-stage or multi-stage bootloader program. For example, second code module 108 may be a grand unified bootloader (GRUB), or other bootloader as would be appreciated by a person of ordinary skill in the art. Second code module 108 may also be an ONIE module.

In some aspects, once software running on a CPU of system 100 executes first code module 104, first code module 104 may cryptographically measure second code module 108, which is the next code module in the boot chain. For example, first code module 104 may cryptographically measure second code module 108 and send the measurement to TPM 106. A representation of the measurement may be stored in a PCR of TPM 106.

Third code module 110 may be an OS kernel such as, but not limited to, the Linux kernel, Windows kernel, or macOS kernel. Third code module 110 may include an integrity measurement subsystem such as, but not limited, to an IMA module of the Linux kernel.

In some aspects, once software running on a CPU of system 100 executes second code module 108, second code module 108 may cryptographically measure code module 110 and send the measurement to TPM 106. A representation of the measurement may be stored in a PCR of TPM 106.

As a non-limiting example, in a Linux system, an IMA module may provide the functionality of performing measurements during run-time and remote attestation. The IMA module may calculate a boot aggregate value. The boot aggregate value may be a cryptographic hash over the values stored in all the lower-level PCRs of TPM 106. For example, registers PCR[0] through PCR[9] may be referred to as lower-level PCRs. For example, PCR[9] is a low-level PCR that may contain a measurement of the operating system kernel binary (e.g., the Linux kernel) as computed by the second code module 108 (e.g., GRUB). The boot aggregate value may be a SHA hash value computed over the low-level PCRs. The boot aggregate value may be extended to register PCR[10] of TPM 106. In addition, once third code module 110 boots, run-time user space measurements of files, libraries, and/or binaries may also be extended to register PCR [10]. For example, when a first user space measurement (e.g., U1) is extended to PCR[10], the value of PCR[10] is updated to SHA256(PCR[10]||U1), where SHA256(PCR [10]||U1) is a SHA-256 hash of the current value of PCR[10] (e.g., the boot aggregate value extended to PCR[10]) and the extended user space measurement U1.

In some aspects, PCRs of TPM 106 may store extended measurements as described in trusted computing group (TCG) PC Client Platform Firmware Profile Specification, version 1.05. PCR[0] of TPM 106 may store extended measurements corresponding to first code module 104 (e.g., firmware used to perform hardware initialization during the boot process, BIOS firmware, UEFI, and/or event separator). PCR[1] of TPM 106 may store extended measurements corresponding to one or more of system management BIOS tables, CPU microcode, boot variables, and event separator. PCR[2] of TPM 106 may store extended measurements corresponding to UEFI drivers. PCR[3] of TPM 106 may store extended measurements corresponding to UEFI driver configuration. PCR[4] of TPM 106 may store be extended measurements corresponding to globally unique identifier partition table, master boot record, and/or event separator. PCR[5] of TPM 106 may store extended measurements corresponding event separator. PCR[7] of TPM 106 may store extended measurements corresponding to secure boot, variable authority, or event separator. PCR[9] of TPM 106 may store extended measurements corresponding to kernel binary measurement performed by second code module 108. For example, GRUB may measure the kernel binary (e.g., the Linux kernel) and extended the measurement into PCR [9] of TPM 106. PCR[10] of TPM 106 may store the boot aggregate value and extended run-time user space measurement of files, libraries, and/or binaries performed by an integrity measurement subsystem of the OS (e.g., IMA in the Linux kernel).

The values stored in registers PCR[0] to PCR[9] of TPM 106 may be used for attesting the integrity of the bootstrapping sequence. The boot aggregate value in PCR[10] may also be used for attesting the bootstrapping sequence. However, attesting the boot sequence using the boot aggregate value suffers from a serious technical problem: the boot aggregate value does not take into account the existence of a HWRoT (e.g., HWRoT 102) that is independent and in addition to a TPM (e.g., TPM 106). Because the boot aggregate value may be calculated by the OS kernel, and the kernel itself should not be considered to be trusted code without external validation, the boot aggregate value itself generally cannot be trusted. In other words, the OS kernel may need to be validated via the trust chain independently of the boot aggregate value when a HWRoT is available to build such a chain.

Embodiments herein solve this technological problem by validating the OS kernel via the trust chain independently of the boot aggregate value when a HWRoT (e.g., HWRoT 102) is available to build such a chain. For example, embodiments herein modify the remote attestation agent running on system 100 to not rely on the boot aggregate value but rather to rely on the individual PCRs that are used as input to the boot aggregate value. Embodiments herein further solve the above technological problem through inclusion of HWRoT that is independent and in addition to the TPM, and creating a trust chain that is anchored to the HWRoT that extends all the way into user space operations via an integrity measurement subsystem (e.g., IMA).

In some aspects, information corresponding to values stored in PCRs of TPM 106 may be sent to remote attestation server 112 to perform remote attestation. As discussed above, remote attestation is a method by which a computing device (e.g., system 100) authenticates its hardware and software components to a remote attestation server (e.g., remote attestation server 112). For example, the software components can be represented as hashes of files, binaries, and libraries from system 100. The boot aggregate value of the PCR registers of TPM 106 may represent the hardware components of system 100.

However, as discussed above, the boot aggregate value generally cannot be trusted. To overcome this technical problem, system's 100 OS kernel may be validated independently of the boot aggregate value using a chain of trust based on HWRoT 102. For example, to accomplish remote attestation without using the boot aggregate value, a remote attestation agent associated with third code module 110 may be configured to instruct remote attestation server 112 to attest the values stored in the lower level PCRs of TPM 106 thereby avoiding using the boot aggregate value.

Remote attestation server 112 may have an allowed list of cryptographic measurements corresponding to the PCRs of TPM 106. In some aspects, the allowed list of cryptographic measurements may be a set of cryptographic hashes. Remote attestation server 112 may match the PCRs values sent by third code module 110 with the allowed list of cryptographic measurements stored at remote attestation server 112. The allowed list of measurements and boot aggregate files may be downloaded from a portal server and loaded into remote attestation server 112. A new allowed list may be made available for download from a portal server or other out-of-band mechanism for every release of the OS. At remote attestation server 112, the allowed list and boot aggregate value that are downloaded from the portal server may be signed by a private key corresponding to the portal server. Further, before remote attestation may be performed for a particular computing device (e.g., system 100), TPM 106 chip may need to be provisioned into remote attestation server 112. In some aspects, provisioning TPM 106 chip into remote attestation server 112 may involve providing the remote attestation server 112 with cryptographic keys corresponding to TPM 106 chip. In some aspects, provisioning TPM 106 chip into remote attestation server 112 may also involve providing remote attestation server 112 with a unique identifier corresponding to the device containing the TPM 106 chip.

A subsystem corresponding to third code module 110 may generate a TPM attestation quote and send it to remote attestation server 112. For example, in a Linux system, an IMA module may generate a TPM attestation quote and send it to remote attestation server 112. The TPM attestation quote sent to the remote attestation server 112 may be digitally signed using a private key (e.g., an attestation key) generated by TPM 106. Through secure TPM design, this signing key may not be practically extractable from the TPM and is therefore a trusted component. The TPM attestation quote may include a set of PCR values (e.g., PCR[0]-[10]) digitally signed with TPM's 106 private key. Remote attestation server 112 may verify the digital signature of the TPM attestation quote so as to authenticate the PCR values. A match between the values of the PCRs sent to the remote attestation server 112, and the allowed list of hash values at remote attestation server 112 may verify the integrity of the booting process.

Similarly, remote attestation server 112 may compare the measurements maintained by the integrity measurement subsystem (e.g., an IMA module) against the allowed list. The allowed list may include a predefined list of SHA-256 hashes of all required files, binaries, and libraries, and may be generated for each release of the system software or firmware.

As a non-limiting example, remote attestation server 112 may comprise a Keylime verifier. Keylime is an open source project for remote attestation. The Keylime project includes, but is not limited to, a Keylime server, a Keylime verifier, a Keylime registrar, and a Keylime agent. A Keylime verifier may periodically verify the integrity state of a computing device that a Keylime agent is running on. A Keylime registrar may be a database of all Keylime agents of each computing device registered with Keylime. A Keylime agent may be a remote attestation agent deployed on each computing device (e.g., system 100) that is to be measured and attested. An allowed list of cryptographic measurements may be input into the Keylime server so that the server can map the allowed list to the deployable computing device. The allowed list of cryptographic measurements may comprise, but is not limited to, SHA-256 hash values corresponding to first code 104 module, second code module 108, and third code module 110.

A Keylime agent may be associated with third code module 110. A unique user identifier may uniquely identify each Keylime agent communicating with a Keylime server (e.g., remote attestation server 112). The Keylime agent may be configured to instruct a Keylime verifier (e.g., implemented at remote attestation server 112), to attest the values stored in the lower level PCRs of TPM 106 without using the boot aggregate value. However, before remote attestation may be performed for a particular computing device (e.g., system 100), TPM 106 chip may need to be provisioned into the Keylime server. In some aspects, provisioning TPM 106 chip into Keylime server may involve providing the Keylime server with cryptographic keys corresponding to TPM 106 chip. TPM attestation quotes may be signed messages from TPM 106. As noted in [0035] above, the signing key may be a private key built into TPM 106 that is designed to not be practically extractable, and therefore is trusted. The validity of the TPM attestation quote may be determined based on whether the provided hash value (e.g., a SHA-256 digest) contained in the TPM attestation quote matches what the Keylime server (e.g., remote attestation server 112) has in its allowed list of cryptographic measurements for the corresponding code module.

Figure 2:
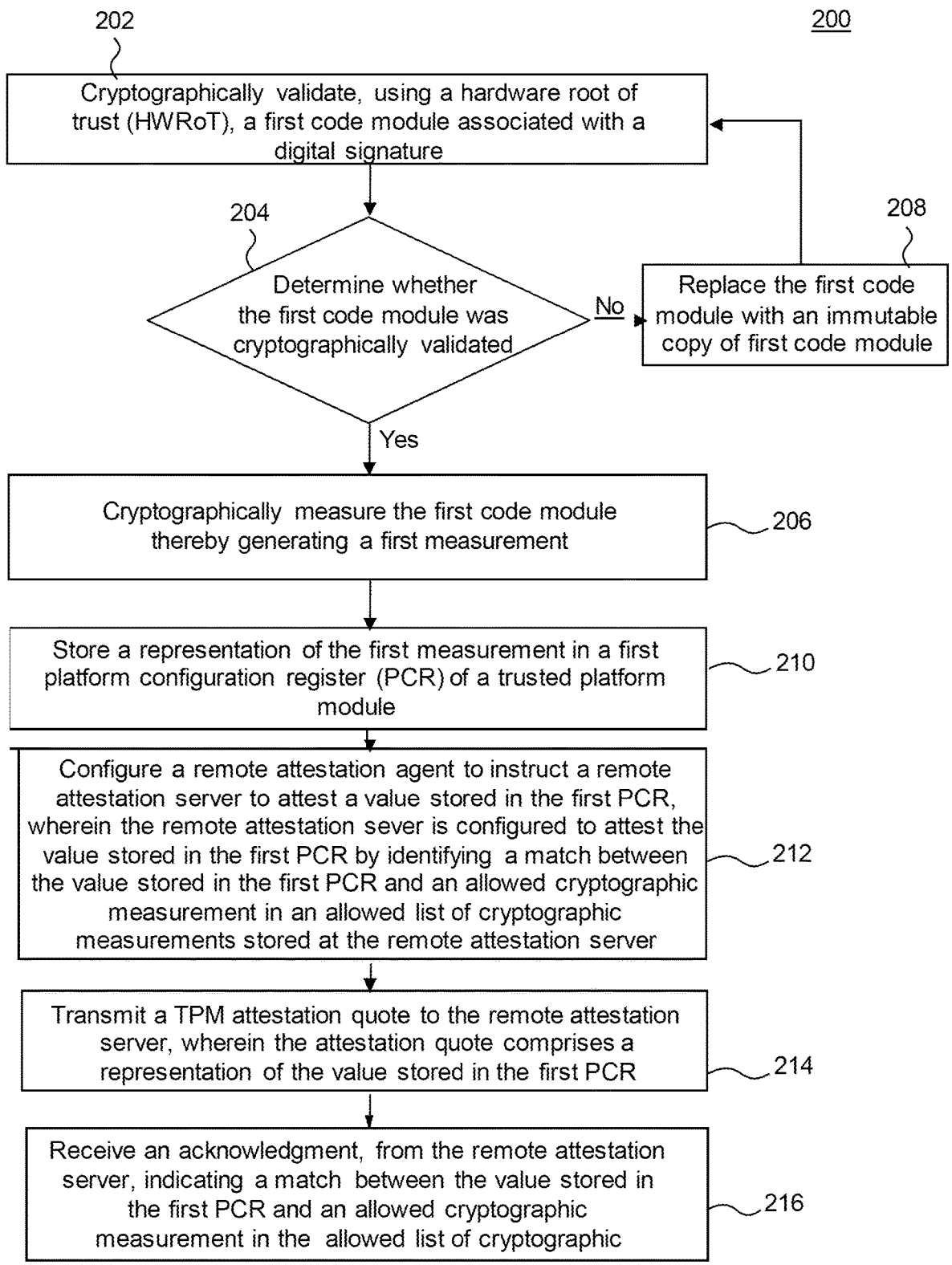
FIG. 2 is a flowchart illustrating a process for implementing trust chain preservation for remote attestation using a HWRoT, according to some embodiments.

FIG. 2 is a flowchart for a method 200 for implementing trust chain preservation for remote attestation using a HWRoT, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, HWRoT 102 cryptographically validates first code module 104. To cryptographically validate first code module 104, HWRoT 102 may validate a cryptographic signature 116 of first code module 104. Cryptographic signature 116 may be generated by performing a cryptographic hash of first code module 104 using a hash algorithm, and then encrypting the generated hash using a private key corresponding to first code module 104. The cryptographic signature 116 of first code module 104 may be generated based various digital signature algorithms including, but not limited to, a Rivest-Shamir-Adleman (RSA) digital signature algorithm or elliptic curve digital signature algorithms.

HWRoT 102 may validate cryptographic signature 116 by decrypting the cryptographic hash that was signed using public key 114 associated with first code module 104 thereby obtaining a first hash value corresponding to first code module 104. HWRoT 102 may then execute the hash algorithm over first code module 104, thereby generating a second hash value. A match between the first hash value and the second hash value may successfully validate cryptographic signature 116.

In 204, HWRoT 102 determines whether first code module 104 was cryptographically validated. For example, first code module 104 may be cryptographically validated when the first hash value and the second hash value from 202 match (e.g., when the cryptographic signature 116 is verified). HWRoT 102 may also determine that first code module 104 is not cryptographically validated when the first hash value and the send hash value from 202 do not match. If this is the case, method 200 proceeds to 208. Otherwise, method 200 proceeds to 206.

In 206, after first code module 104 is cryptographically validated, first code module 104 is cryptographically measured to generate a first measurement. For example, HWRoT 102 may measure first code module 104. Software running on a CPU of system 100 may also measure first code module 104. Cryptographically measuring first code module 104 may comprise computing a cryptographic hash value of first code module 104. The cryptographic hash value may be computed using SHA-256 or SHA3-256. According to some aspects, first code module 104 may cryptographically measure itself to generate a first measurement. Since HWRoT 102 validates first code module 104, first code module 104's measurement of itself may be considered trusted.

In 208, in response to determining that first code module 104 is not cryptographically validated, HWRoT 102 replaces first code module 104 with an immutable copy of the first code module 104. HWRoT 102 may then cryptographically measure the copy of first code module 104 thereby generating an updated first measurement value.

In 210, software running on a CPU of system 100 stores a representation of the first measurement in a first PCR of TPM 106. A representation of the first measurement may correspond to a cryptographic hash of the first measurement. A representation of the first measurement may be stored in PCR[0] of TPM 106. The first measurement may be stored in a PCR of TPM 106 using a TPM extend function. PCR[0] of TPM 106 may be extended measurements corresponding to first code module 104 (e.g., a BIOS image or UEFI image). First code module 104 may then cryptographically measure the second code module 108 thereby generating a second measurement value. The second measurement value may be extended to a PCR of TPM 106. Second code module 108 may then cryptographically measure third code module 110 thereby generating a third measurement value. The third measurement value may be extended to a PCR of TPM 106. The values stored in registers PCR[0] to PCR[9] of TPM 106 can constitute the chain of trust that may be used for attesting the integrity of the bootstrapping sequence.

As a non-limiting example, a Linux IMA module may calculate a boot aggregate value which is a cryptographic hash over the values stored in a plurality of lower-level PCRs of TPM 106. In this example, PCRs numbered 0 to 9 may be referred to as lower-level PCRs. The boot aggregate value may be the first value that is extended to PCR[10] of TPM 106. Further, the PCR[10] of TPM 106 may be extended run-time user space measurements of file system binaries performed by IMA in the Linux kernel.

In 212, system 100 configures a remote attestation agent to instruct remote attestation server 112 to attest the values stored in the PCRs of TPM 106. Remote attestation server 112 may attest a value stored in a PCR of TPM 106 by identifying a match between the value stored in the PCR and an allowed cryptographic measurement in the allowed list of cryptographic measurements stored at remote attestation server 112. The remote attestation agent (e.g., a Keylime agent) may instruct remote attestation server 112 to attest the integrity of the bootstrapping sequence. In response, remote attestation server 112 may match the allowed list of cryptographic measurements with the individual PCR values. As a result, this approach bypasses reliance on the boot aggregate value when attesting to the integrity to the bootstrapping sequence.

The allowed list of cryptographic measurements may comprise an allowed list of cryptographic hash values. The allowed list of cryptographic measurements may comprise a hash of first code module 104 (e.g., a BIOS file or UEFI file). The allowed list of cryptographic measurements may comprise a hash of a GRUB, or ONIE module. The remote attestation agent may be a Keylime agent, and the remote attestation server 112 may be a Keylime verifier module. TPM 106 is provisioned into the remote attestation server 112 such that the remote attestation agent can send digitally signed TPM attestation quotes to the remote attestation server 112. In some aspects, provisioning TPM 106 into remote attestation server 112 may involve providing the remote attestation server with cryptographic keys corresponding to TPM 106 chip. In some aspects, provisioning TPM 106 into remote attestation server 112 may also involve providing the remote attestation server with a unique identifier corresponding to the device containing the TPM 106 chip. In some aspects, the TPM attestation quote may include values stored in all PCRs of TPM 106. The TPM attestation quote may include the boot aggregate value, and the remote attestation server 112 may use the boot aggregate value to attest the values stored in a plurality of PCRs of TPM 106.

In 214, third code module 110 transmits a TPM attestation quote to remote attestation server 112. The TPM attestation quote may contain a representation of the values stored in the PCRs of TPM 106. The TPM attestation quote may comprise values of the PCRs of TPM 106. The TPM attestation quote sent to the remote attestation server 112 may be digitally signed using a private key (e.g., an attestation key) generated by TPM 106. A match between the values of the PCRs sent to the remote attestation server 112 and the allowed list of hash values at the remote attestation server 112 verifies the integrity of the booting process.

In 216, remote attestation agent on system 100 receives an acknowledgment from remote attestation server 112 indicating a match between the value stored in the first PCR and an allowed cryptographic measurement in the allowed list of cryptographic measurements stored at remote attestation server 112. The acknowledgment received from remote attestation server 112 may be piggybacked along with other information sent from remote attestation server 112.

Figure 3:
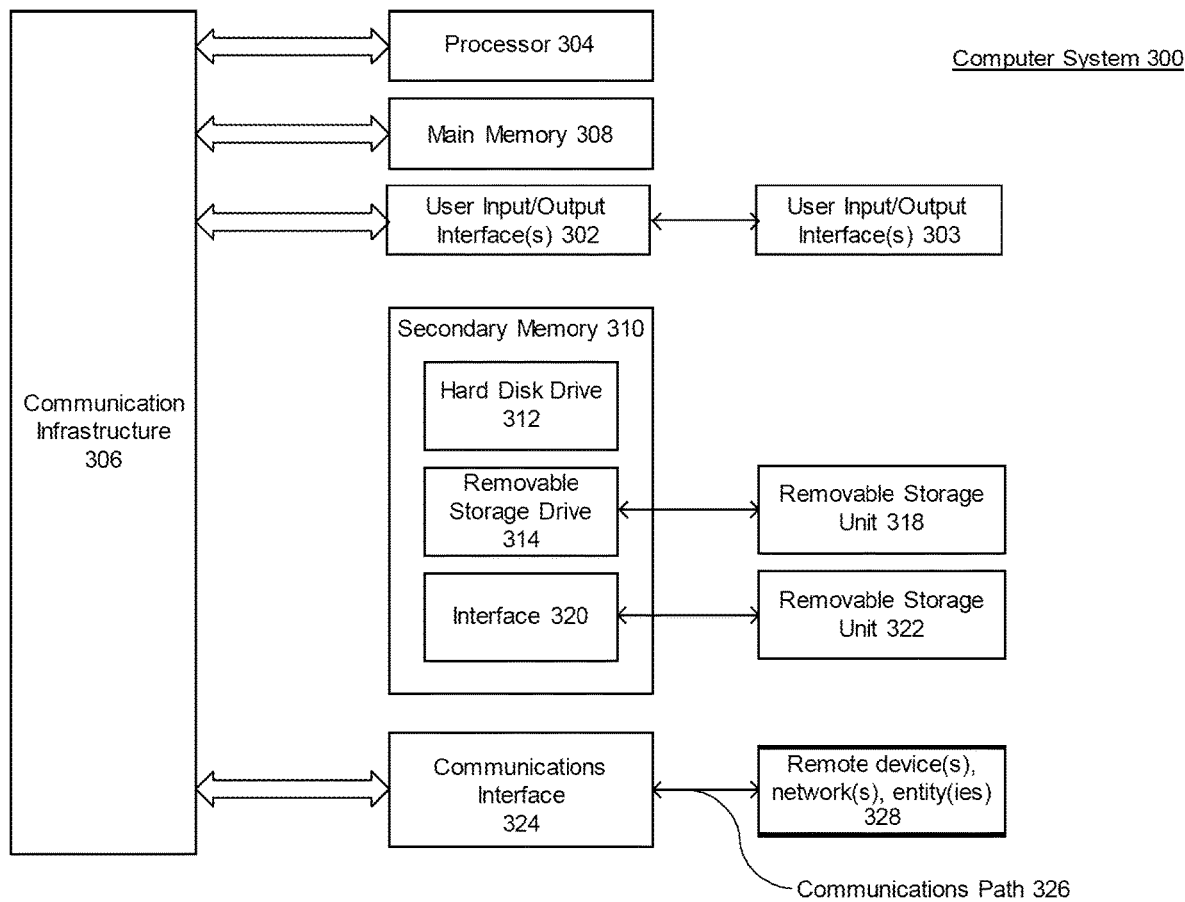
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a computer networking router, computer networking switch, personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for verifying the integrity of a boot process without using a boot aggregate value computed by a trusted platform module (TPM), comprising:
   cryptographically validating, by a hardware root of trust (HWRoT), a first code module associated with a digital signature;
   determining, by the HWRoT, that the first code module was cryptographically validated upon a first boot;
   based on a determination that the first code module was cryptographically validated upon the first boot, cryptographically measuring the first code module, by the HWRoT, thereby generating a first hash measurement;
   storing the first hash measurement in a first platform configuration register (PCR) of the TPM;
   cryptographically measuring a second code module, by the first code module, thereby generating a second hash measurement and storing the second hash measurement in a second PCR of the TPM;
   configuring a remote attestation agent to instruct a remote attestation server to attest values stored in the first PCR and the second PCR, wherein the remote attestation server is configured to attest the values stored in the first PCR and the second PCR by identifying a match between the values stored in the first PCR and the second PCR and allowed cryptographic measurements in an allowed list of cryptographic measurements stored at the remote attestation server, and wherein the allowed list of cryptographic measurements is an allowed list of cryptographic hash values;
   transmitting a TPM attestation quote to the remote attestation server, wherein the TPM attestation quote comprises the values stored in the first PCR and the second PCR; and
   receiving an acknowledgment, from the remote attestation server, indicating a match between the values stored in the first PCR and the second PCR and the allowed cryptographic measurements in the allowed list of cryptographic measurements stored at the remote attestation server.

2. The method of claim 1, wherein the cryptographically validating the first code module further comprises:
   verifying the digital signature using a public key corresponding to the digital signature.

3. The method of claim 1, further comprising:
   determining, by the HWRoT, upon a subsequent boot, that the first code module was not cryptographically validated;
   based on the determination, upon the subsequent boot, that the first code module was cryptographically not validated, replacing the first code module with an immutable copy of the first code module; and
   cryptographically measuring the first code module thereby generating an updated first hash measurement.

4. The method of claim 1, wherein the cryptographically measuring the first code module further comprises:
   computing a cryptographic hash value of the first code module using a secure hash algorithm (SHA).

5. The method of claim 1, further comprising:
   cryptographically measuring a third code module thereby generating a third measurement; and
   storing a representation of the third measurement in a third PCR of the TPM, wherein the representation of the third measurement is a hash of a current value stored in the third PCR and the third measurement.

6. The method of claim 1, wherein the first code module is a firmware used to perform hardware initialization during the boot process.

7. The method of claim 1, wherein the remote attestation agent is a Keylime agent.

8. A system for verifying the integrity of a boot process without using a boot aggregate value computed based on platform configuration registers (PCR) values stored in a trusted platform module (TPM), comprising:
   a memory;
   a hardware root of trust (HWRoT);
   the TPM; and
   at least one processor coupled to the memory, the HWRoT, and the TPM,
   wherein the HWROT is configured to:
      cryptographically validate a first code module associated with a digital signature;
      determine that the first code module was cryptographically validated upon a first boot; and
   wherein, based on a determination that the first code module was cryptographically validated upon the first boot, the at least one processor is configured to:
      cryptographically measure the first code module, using the HWRoT, thereby generating a first hash measurement;
      store the first hash measurement in a first PCR of the TPM;
      cryptographically measure a second code module, using the first code module, thereby generating a second hash measurement and storing the second hash measurement in a second PCR of the TPM;
      configure a remote attestation agent to instruct a remote attestation server to attest values stored in the first PCR and the second PCR, wherein the remote attestation server is configured to attest the values stored in the first PCR and the second PCR by identifying a match between the values stored in the first PCR and the second PCR and allowed cryptographic measurements in an allowed list of cryptographic measurements stored at the remote attestation server, and wherein the allowed list of cryptographic measurements is an allowed list of cryptographic hash values;
      transmit a TPM attestation quote to the remote attestation server, wherein the TPM attestation quote comprises the value stored in the first PCR and the second PCR; and
      receive an acknowledgment, from the remote attestation server, indicating a match between the values stored in the first PCR and the second PCR and the allowed cryptographic measurements in the allowed list of cryptographic measurements stored at the remote attestation server.

9. The system of claim 8, wherein to cryptographically validate the first code module, the HWROT is further configured to:
   verify the digital signature using a public key corresponding to the digital signature.

10. The system of claim 8, wherein the HWROT is further configured to:
   determine, upon a subsequent boot, that the first code module was not cryptographically validated;
   based on the determination, upon the subsequent boot, that the first code module was cryptographically not validated, replace the first code module with an immutable copy of the first code module; and cryptographically measure the first code module thereby generating an updated first measurement.

11. The system of claim 8, wherein to cryptographically measure the first code module, the HWROT is further configured to:
compute a cryptographic hash value of the first code module using a secure hash algorithm (SHA).

12. The system of claim 8, wherein the at least one processor is further configured to:
cryptographically measure a third code module thereby generating a third measurement; and
store a representation of the third measurement in a third PCR of the TPM wherein the representation of the third measurement is a hash of a current value stored in the third PCR and the third measurement.

13. The system of claim 8, wherein the first code module is a firmware used to perform hardware initialization during the boot process.

14. The system of claim 8, wherein the remote attestation agent is a Keylime agent configured to communicate with a Keylime remote attestation server.

15. A non-transitory computer-readable medium (CRM) having instructions stored thereon that, when executed by at least one computing device, causes the at least one computing device to perform operations comprising:
cryptographically validating, using a hardware root of trust (HWRoT), a first code module associated with a digital signature;
determining, using the HWROT, that the first code module was cryptographically validated upon a first boot;
based on a determination that the first code module was cryptographically validated upon the first boot, cryptographically measuring the first code module, by the HWRoT, thereby generating a first hash measurement;
storing the first hash measurement in a first platform configuration register (PCR) of a trusted platform module (TPM);
cryptographically measuring a second code module, by the first code module, thereby generating a second hash measurement and storing the second hash measurement in a second PCR of the TPM;
configuring a remote attestation agent to instruct a remote attestation server to attest values stored in the first PCR and the second PCR, wherein the remote attestation server is configured to attest the values stored in the first PCR and the second PCR by identifying a match between the values stored in the first PCR and the second PCR and allowed cryptographic measurements in an allowed list of cryptographic measurements stored at the remote attestation server, and wherein the allowed list of cryptographic measurements is an allowed list of cryptographic hash values;
transmitting a TPM attestation quote to the remote attestation server, wherein the TPM attestation quote comprises the values stored in the first PCR and the second PCR; and
receiving an acknowledgment, from the remote attestation server, indicating a match between the values stored in the first PCR and the second PCR and the allowed cryptographic measurements in the allowed list of cryptographic measurements stored at the remote attestation server.

16. The non-transitory CRM of claim 15, wherein the cryptographically validating the first code module comprises:
verifying the digital signature using a public key corresponding to the digital signature.

17. The non-transitory CRM of claim 15, the operations further comprising:
determining, using the HWRoT, upon a subsequent boot, that the first code module was not cryptographically validated;
based on the determination, upon the subsequent boot, that the first code module was cryptographically not validated, replacing the first code module with an immutable copy of the first code module; and
cryptographically measuring the first code module thereby generating an updated first measurement.

18. The non-transitory CRM of claim 15, wherein cryptographically measuring the first code module further comprises:
computing a cryptographic hash value of the first code module using a secure hash algorithm (SHA).

19. The non-transitory CRM of claim 15, the operations further comprising:
cryptographically measuring a third code module thereby generating a third measurement; and
storing a representation of the third measurement in a third PCR of the TPM wherein the representation of the third measurement is a hash of a current value stored in the third PCR and the third measurement.

20. The non-transitory CRM of claim 15, wherein the first code module is a firmware used to perform hardware initialization during a boot process.

* * * * *

UNITED STATES PATENT AND TRADEMARK OFFICE
CERTIFICATE OF CORRECTION

PATENT NO. : 12,287,881 B2
APPLICATION NO. : 17/717581
DATED : April 29, 2025
INVENTOR(S) : Schroder et al.

Page 1 of 1

It is certified that error appears in the above-identified patent and that said Letters Patent is hereby corrected as shown below:

In the Claims

In Column 14, Claim 8, Line 15, delete "HWROT" and insert -- HWRoT --, therefor.

In Column 14, Claim 9, Line 56, delete "HWROT" and insert -- HWRoT --, therefor.

In Column 14, Claim 10, Line 60, delete "HWROT" and insert -- HWRoT --, therefor.

In Column 15, Claim 11, Line 4, delete "HWROT" and insert -- HWRoT --, therefor.

In Column 15, Claim 15, Line 29, delete "HWROT," and insert -- HWRoT, --, therefor.

Signed and Sealed this
Tenth Day of June, 2025

Coke Morgan Stewart
*Acting Director of the United States Patent and Trademark Office*